March 13, 1962 HANS-JOACHIM PAHNKE ETAL 3,024,772
CONTROL MEANS FOR HYDRAULIC PRESSES
Filed Aug. 31, 1959

United States Patent Office 3,024,772
Patented Mar. 13, 1962

3,024,772
CONTROL MEANS FOR HYDRAULIC PRESSES
Hans-Joachim Pahnke and Walter Krohmann, Dusseldorf-Rath, Germany, assignors to Maschinenfabrik Sack G.m.b.H., Dusseldorf-Rath, Germany, a body corporate of Germany
Filed Aug. 31, 1959, Ser. No. 837,230
Claims priority, application Germany Sept. 4, 1958
5 Claims. (Cl. 121—164)

This invention relates to automatic control means for a hydraulic press in which both the position and the length of the stroke of the ram or plunger of the press can be continuously varied during its operation.

According to the invention, the press is provided with control means on the ram or plunger and a shaft connecting the control means to cam means for controlling the flow of pressure medium to and from the press cylinder, a differential gear being interposed between the control means on the ram and the cam means, whereby the cam means may be displaced relative to the control means, so as to alter the position of the piston stroke relative to the press cylinder.

According to a preferred construction, the cam means is actuated by a rack which moves upwards and downwards with the press plunger or the ram. The alteration in the position of the stroke and the length or height of the stroke is effected by a double differential gear arranged between the rack drive and the cam drive.

A control mechanism constructed in accordance with the invention is illustrated diagrammatically and by way of example in the accompanying drawing.

Figure 1:
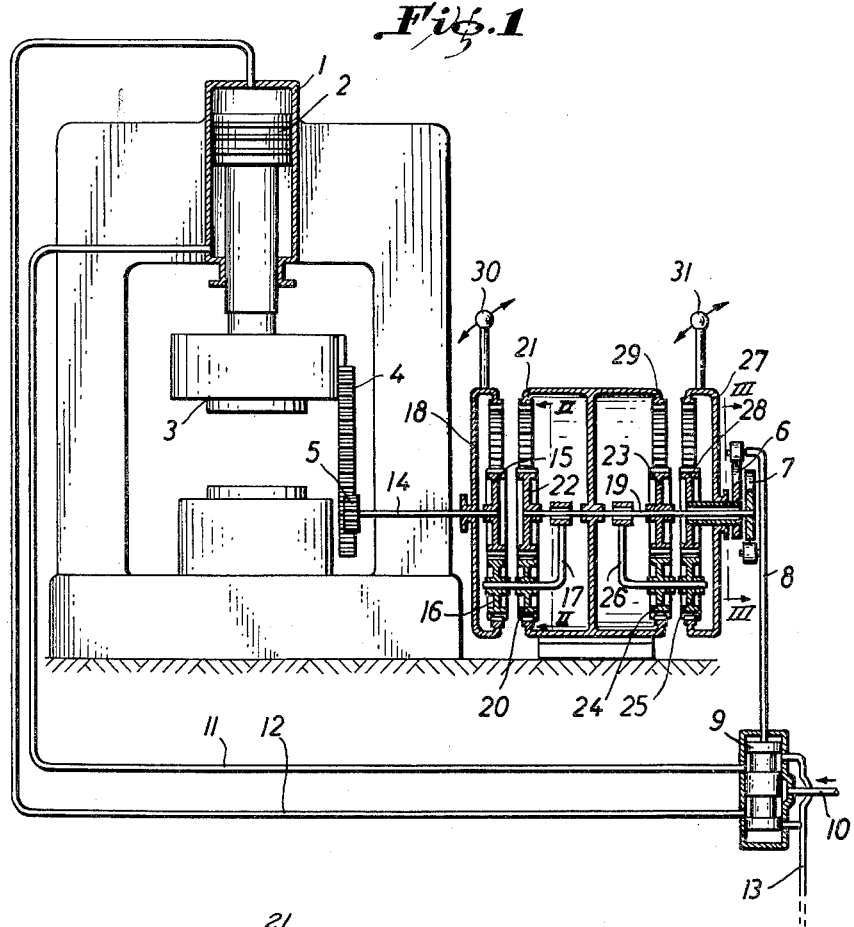
FIG. 1 is a side-elevational view, partly in section, of a press and its control means.
Figure 2:
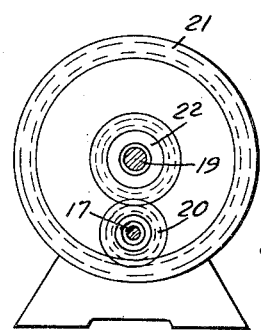
FIG. 2 is a cross-sectional view taken along line II—II of FIG. 1.
Figure 3:
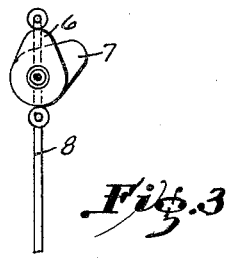
FIG. 3 is a cross-sectional view taken along line III—III of FIG. 1.

As shown in the drawing, the press piston 2 is movable in a hydraulic cylinder 1. The piston 2 is in the form of a differential piston and is rigidly connected to the ram or plunger 3 of the press. To the ram 3 is fixed a rack 4 with which a pinion 5 meshes. The pinion 5 drives two cams 6 and 7 by means of a differential gear system. The cam 6 moves a push rod 8 upwardly and the cam 7 moves this rod downwardly. A slide valve 9 is rigidly connected to the push rod 8. In its lower position the slide valve 9 connects a pipe 10 leading from a source of pressure medium to a pipe 11 which communicates with the lower chamber of the cylinder 1. At the same time the pipe 12 connected to the upper chamber of the cylinder 1 communicates with the return pipe 13. The piston 2 is, therefore, raised by the liquid flowing out from the pipe 11. When the slide valve is in its upper position the pressure pipe 10 is in communication with the pipe 12 and the pipe 11 is in communication with the return pipe 13. In this case the piston 2 is pressed downwards.

The differential gear system shown in the drawing operates in the following manner. A shaft 14 rigidly connects the pinion 5 with a central gear 15. A planet gear 16 which is driven by the gear 15 is rotatably mounted on a crank 17 and rolls in the internal teeth of a ring gear 18. Therefore, the crank 17, which is freely rotatable on a shaft 19, is rotated and the planet gear 20 which is also mounted on the crank 17 rolls on the internal teeth of a ring gear 21. Owing to this rolling of the planet gear 20, the ring gear 22, which meshes with it, and shaft 19 which is rigidly connected with the wheel 22, rotate together with the cam 7.

A central gear 23 which is rigidly connected to the shaft 19 drives a central gear 28 by way of gears 24, 25 and 29, a crank 26 and internal teeth on a ring gear 27 in the same manner as the gear 22 is driven from the gear 15. The shaft of the gear 28 is hollow and on the one hand is mounted to be freely rotatable on the shaft 19 and on the other hand is rigidly connected to the cam 6.

The ring gears 21 and 29, which are arranged in a common frame, are connected permanently with the base of the press and, therefore, do not rotate. The ring gears 18 and 27 are also stationary but rotatable by means of respective hand levers 30, 31 around their axes and adjustable to all angular positions. The ring gears 18, 21 and 27 are independent of one another so as to enable a rotation of the gears 18 and 27 around their axes and also relatively to the gears 28 and 29.

Upon a rotation of the ring gear 18 by lever 30, the planet gear 16 in mesh therewith is rotated in the opposite sense around its own axis while revolving in the direction of rotation of gear 18 around the axis of the latter. The gear 16 entrains the crank 17 and with it also the planet gear 20 which drives the gear 22 and the shaft 19 connected thereto, thus rotating the cam 7 fixed to the other end of this shaft. Gear 23, rotating with the shaft 19, brings about the revolution of planet gear 24 about the shaft; planet gear 25, entrained by crank 26, also revolves and, with ring gear 27 stationary, rotates the gear 28 and, therefore, the cam 6 in step with gear 22 and cam 7. Though the cams remain in the same relative position, the dead-center positions of piston 2 and ram 3 are changed.

If, however, the ring gear 27 is rotated by means of the hand lever 31, the planet gear 25 rotates without revolving about the shaft 19 since it is immobilized against such revolution by the crank 26 as long as both the ram 3 and the ring gear 18 are held stationary. Gear 25 drives the central gear 28 which is rigid with cam 6 so that the latter is angularly displaced with respect to cam 7. This changes the relative phasing of the upward and downward motions of rod 8 and, therefore, the spacing between the angular shaft positions in which the reversals of the piston stroke occur; the result is a lengthening or a foreshortening of the piston stroke, depending on the sense of displacement of gear 27.

When the gears 18 and 27 are set in the desired positions thereof and the press piston is reciprocated by the hydraulic fluid, the pinion 5 is set in rotation rack 4 which moves up and down with the ram 3 of the press, pinion 5 thereupon rotating the gear 15 by way of the shaft 14. The planet gear 15 is thus made to revolve about shaft 14 and, via crank 17, entrains the planet gear 20 which takes along the gear 22 and the shaft 19 as well as the cam 7. At the same time the shaft 19 rotates the gear 23 which drives the central gear 28 by means of the planet gear 24, the crank 23 and the planet gear 25 so as to rotate the cam 6.

Thus the two cams 6 and 7 are always rotated together in dependence upon the reciprocations of the ram 3 and the rack 4, their rotation being derived from the pinion 5 and lasting for such a period of time until either the cam 6 shifts the slide valve 9 into the preset upper position or the cam 7 shifts said slide valve 9 into its lower position. Since the movement of the ram is reversed at every shifting of the slide valve 9 from one end position into the other, the ram will reciprocate vertically as long as pressure fluid is delivered by the pipe 10.

Rotation of the hand lever 30 thus causes the stroke of the piston 2 to be shifted either upwardly or downwardly without altering the length of the stroke. Rotation of the hand lever 31, on the other hand, effects an alteration in the length of the stroke.

Instead of a slide-valve control as illustrated in the drawing any other suitable form of control, for example a 4-valve control, can be used without departing from the invention. It is also possible for the cams to actuate electrical control apparatus which transmits controlling impulses to the hydraulic control with the aid of magnets or motors.

We claim:

1. A control mechanism for a fluid-operated press having a reciprocable piston, comprising a source of pressure fluid for said piston, conduit means leading from said source to opposite sides of said piston, valve means in said conduit means for controlling the flow of said fluid therethrough, cam means for actuating said valve means, operating means for said cam means coupled with said piston, and differential gear means connecting said operating means to said cam means, said differential gear means being adjustable for relatively displacing said cam means and said operating means whereby the stroke of said piston can be varied.

2. A control mechanism for a fluid-operated press having a reciprocable piston comprising a source of pressure fluid for said piston, conduit means leading from said source to opposite sides of said piston, valve means in said conduit means for controlling the flow of said fluid therethrough, said valve means having a first and a second position for respectively directing said fluid to said opposite sides, a first and a second cam displaceable relatively to each other and linked with said valve means for respectivly displacing same into said first and second positions, operating means for said cam means coupled with said piston, and differential gear means connecting said operating means to said cams, said differential gear means being adjustable for displacing said cams relatively to each other and to said operating means whereby the stroke of said piston can be varied.

3. A control mechanism for a fluid-operated press having a reciprocable piston, comprising a source of pressure fluid for said piston, conduit means leading from said source to opposite sides of said piston, valve means in said conduit means for controlling the flow of said fluid therethrough, said valve means having a first and a second position for respectively directing said fluid to said opposite sides, a first and a second cam displaceable relatively to each other and linked with said valve means for respectively displacing same into said first and second positions, operating means for said cams coupled with said piston, first differential gear means connecting said operating means to one of said cams for adjusting the relative position thereof, and second differential gear means interconnecting said cams for adjusting their relative position, thereby enabling variations in the position and the length of the stroke of said piston.

4. A control mechanism according to claim 3 wherein said cams are provided with two concentric shafts and said operating means is provided with a further shaft, said first differential gear means having gears respectively joined to said further shaft and one of said concentric shafts, said second differential gear means having gears respectively jointed to said two concentric shafts.

5. A control mechanism according to claim 4 wherein said operating means comprises a rack secured to said piston and a pinion on said further shaft meshing with said rack.

References Cited in the file of this patent

UNITED STATES PATENTS

| | | |
|---|---|---|
| 2,358,650 | Maude | Sept. 19, 1944 |
| 2,488,109 | Adams | Nov. 15, 1949 |
| 2,491,393 | Purcell | Dec. 13, 1949 |